United States Patent
Wu

(10) Patent No.: US 9,211,561 B2
(45) Date of Patent: Dec. 15, 2015

(54) SELF-CLEANING GLUE DISPENSING SYSTEM

(71) Applicant: HON HAI PRECISION INDUSTRY CO., LTD., New Taipei (TW)

(72) Inventor: Cheng-Shiun Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 74 days.

(21) Appl. No.: 14/017,312

(22) Filed: Sep. 4, 2013

(65) Prior Publication Data

US 2014/0102361 A1    Apr. 17, 2014

(30) Foreign Application Priority Data

Oct. 11, 2012 (TW) ............... 101137378 A

(51) Int. Cl.
  *B05B 7/16* (2006.01)
  *B05B 15/02* (2006.01)
  *B05C 9/12* (2006.01)
  *B05C 1/00* (2006.01)
  *G02B 7/02* (2006.01)

(52) U.S. Cl.
  CPC ............... *B05B 15/025* (2013.01); *B05C 1/00* (2013.01); *B05C 9/12* (2013.01); *G02B 7/025* (2013.01)

(58) Field of Classification Search
  USPC .............. 118/302; 15/306.1, 301; 222/148; 347/22–33
  See application file for complete search history.

(56) References Cited

U.S. PATENT DOCUMENTS

| | | | |
|---|---|---|---|
| 6,775,879 B2 * | 8/2004 | Bibeault et al. | 15/306.1 |
| 2006/0139395 A1 * | 6/2006 | Nakashima et al. | 347/22 |
| 2009/0154958 A1 * | 6/2009 | Chen | 399/177 |
| 2013/0075030 A1 * | 3/2013 | Wang | 156/272.4 |

* cited by examiner

*Primary Examiner* — Yewebdar Tadesse
(74) *Attorney, Agent, or Firm* — Novak Druce Connolly Bove + Quigg LLP

(57) ABSTRACT

An exemplary self-cleaning glue dispensing system includes a support, a dispensing device, a driving device and a number of cleaning devices. The support receives lens modules ready to receive glue. The cleaning devices are located on the support. The dispensing device includes a container and a dispensing needle to output the glue. The driving device manipulates the dispensing device to dispense glue into the lens modules and after a preset number of glue dispensations, the driving device moves the dispensing device into the cleaning device to clean off any residual glue.

16 Claims, 7 Drawing Sheets

SELF-CLEANING GLUE DISPENSING SYSTEM

BACKGROUND

1. Technical Field

The present disclosure relates to self-cleaning glue dispensing systems such as those used in the manufacture of electronic devices.

2. Description of Related Art

When assembling a lens module for a product such as an electronic device, glue is required to fix an optical element firmly in a lens barrel, and small needles are needed to dispense the glue as the lens module becomes more compact. However, the residual glue on the circumference of the needle is easily solidified by ultraviolet (UV) light emitted from a UV lamp for drying the dispensed glue or easily solidified by ultraviolet light emitted from a fluorescent in the manufacturing plant. This may result in the needle not dispensing the glue smoothly during a dispensing process, whereby the effectiveness of the dispensing is poor.

Therefore, it is desired to provide a glue dispensing system which can overcome or at least alleviate the above mentioned problems.

DETAILED DESCRIPTION

Figure 1:
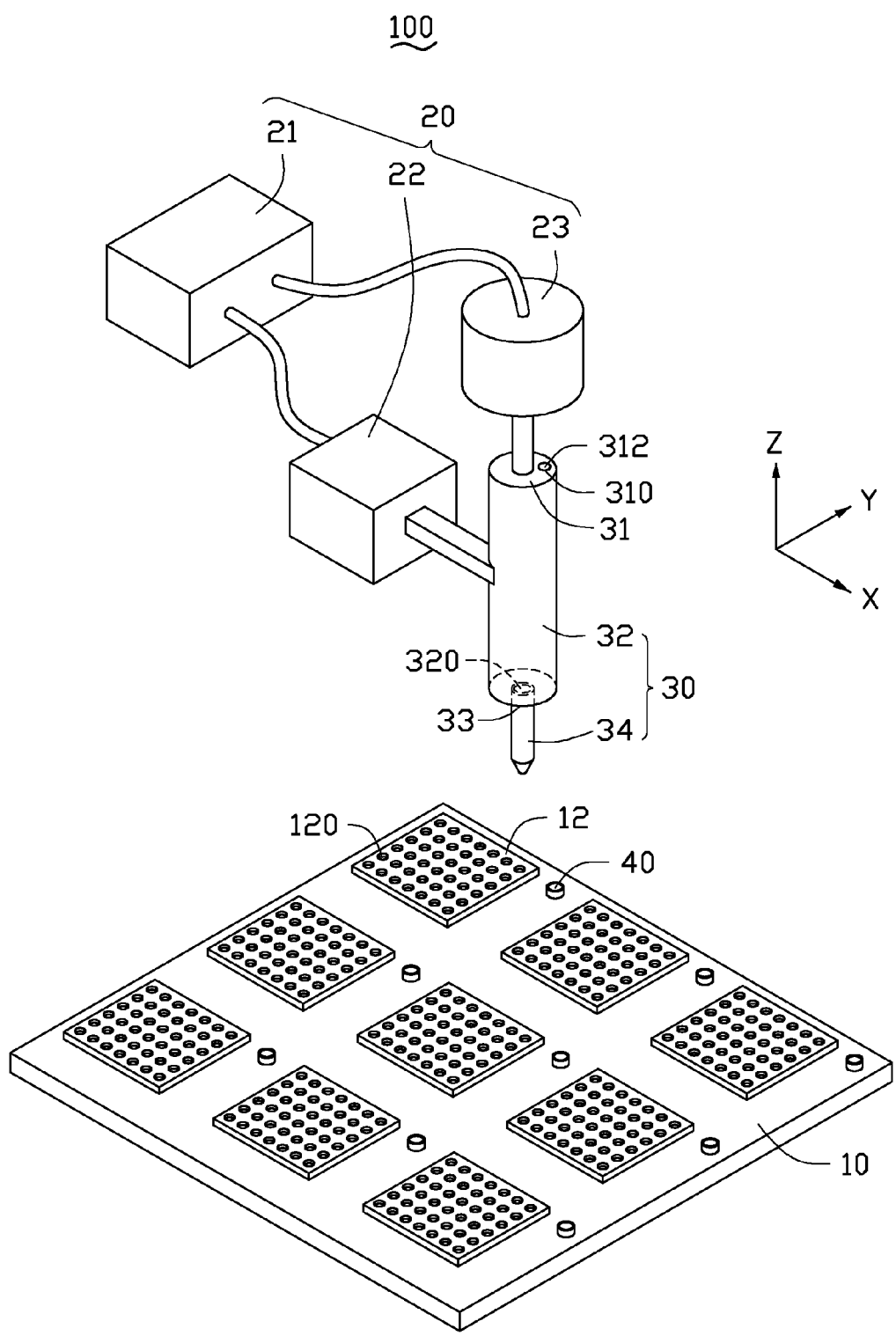
FIG. 1 is a schematic, isometric view of a self-cleaning glue dispensing system including a dispensing needle according to a first embodiment.
Figure 2:
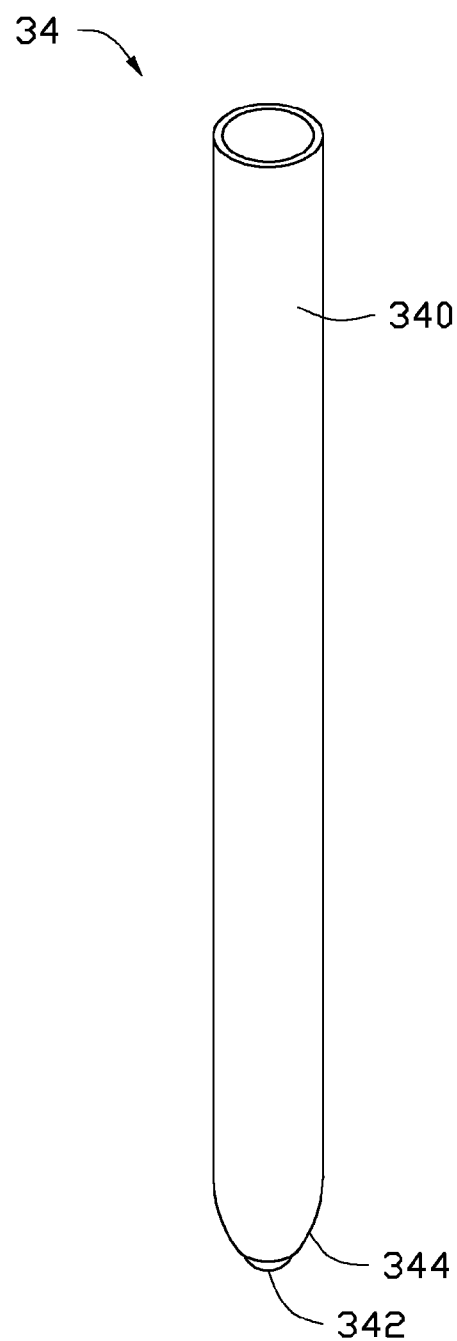
FIG. 2 is an enlarged view of the dispensing needle of FIG. 1.
Figure 3:
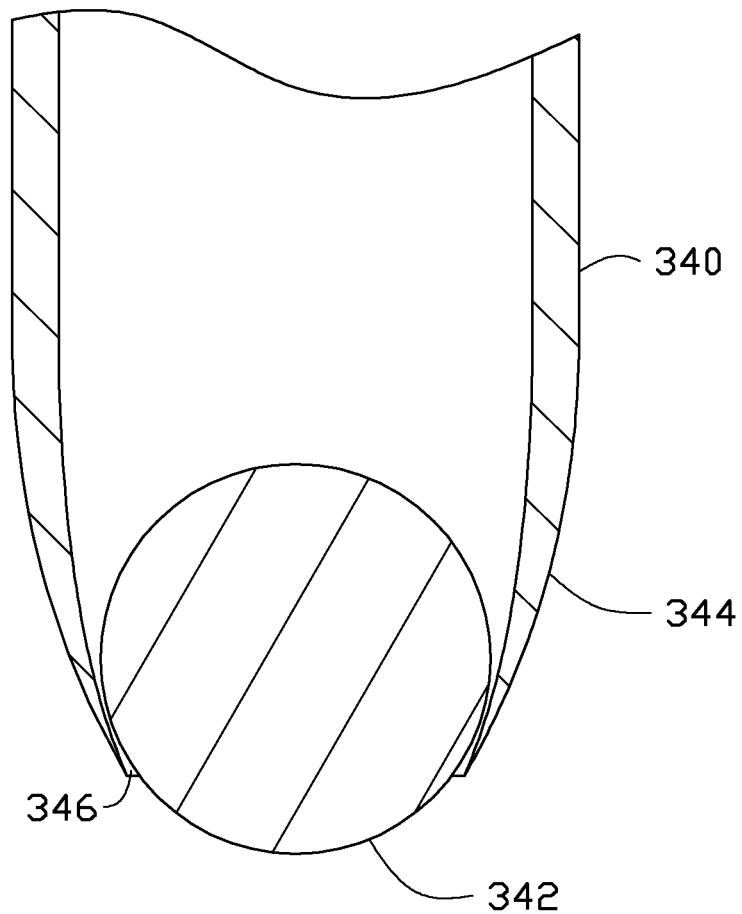
FIG. 3 is an enlarged sectional view of a bottom end of the dispensing needle of FIG. 2.

FIGS. 1-3 show a self-cleaning glue dispensing system 100 according to a first embodiment. The dispensing system 100 includes a support 10, a driving device 20, a dispensing device 30, and a number of cleaning devices 40.

The support 10 is the shape of a plate. The support 10 includes a number of lens trays 12, which are arranged in a regular m×n type array. Each lens tray 12 is configured for receiving a number of lens modules 120 which require to have glue applied ("dry lens modules 120"). In this embodiment, the lens modules 120 are arranged on the lens tray 12 in a regular m×n type array. In other embodiment, the lens trays 12 is configured for receiving a number of workpieces which need glue to adhere.

The driving device 20 is arranged above the support 20, and the dispensing device 30 is fixed on the driving device 20. The driving device 20 is configured to drive the dispensing device 30 to dispense glue in the lens modules 120, and drive the dispensing device 30 to move into the cleaning device 40 to clean the dispensing device 30.

In this embodiment, the driving device 20 includes a control unit 21, a moving unit 22 and a rotate unit 23. The moving unit 22 and the rotate unit 23 are electrically connected with the control unit 21. The control unit 21 is configured to control the moving unit 22 and the rotate unit 23. The moving unit 22 is configured to drive the dispensing device 10 to move in three-dimensional space. The rotate unit 23 is configured to rotate the dispensing device 10.

The dispensing device 30 includes a container 32, and a needle 34 supplied by the container 32. The container 32 is a hollow cylinder, and is configured to supply glue. The container 32 includes a glue input port 310 opposite to the needle 34. The glue input port 310 is configured to allow fresh glue to be put into the container 32. The container 32 further includes a plug 312. The plug 312 seals the glue input port 310.

The needle 34 includes a glue tube 340 and a ball 342 movably received in the glue tube 340. The glue tube 340 includes a glue output end 344. The glue output end 344 defines a round opening 346. A diameter of the ball 342 is greater than a diameter of the round opening 346. The ball 342 seals the round opening 346 when not being pressed inwards from outside of the glue tube 340, and allows the release of glue from the round opening 346 when pressed from the outside of the glue tube 340. The ball 342 is made of metal.

Figure 4:
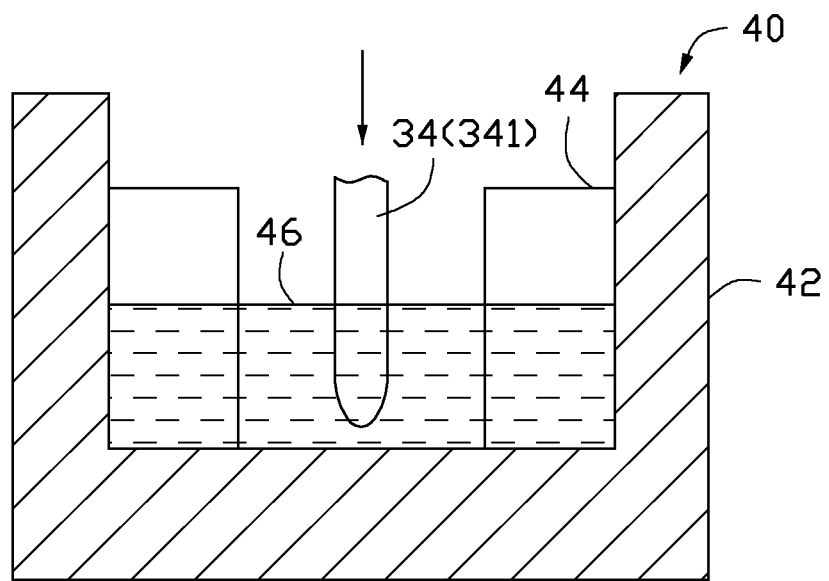
FIGS. 4-6 schematically show successive steps of a cleaning method for the dispensing needle of FIG. 1.

The cleaning devices 40 are fixed on the support 20. Referring to FIG. 4, each cleaning device 40 includes a tank 42, a sponge 44 and cleaning liquid 46. The sponge 44 is annular and is fixed on the inner wall of the tank 42. The cleaning liquid 46 is absorbed by the sponge 44. The cleaning liquid 46 is ethanol or acetone. In this embodiment, one cleaning device 40 corresponds to one lens tray 12, and each cleaning device 40 is arranged beside the corresponding lens tray 12.

Figure 5:
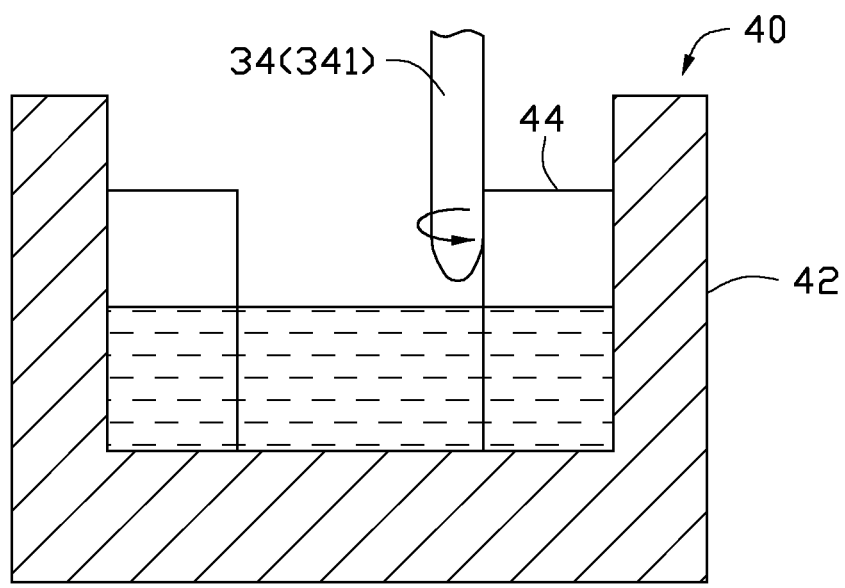
Figure 6:
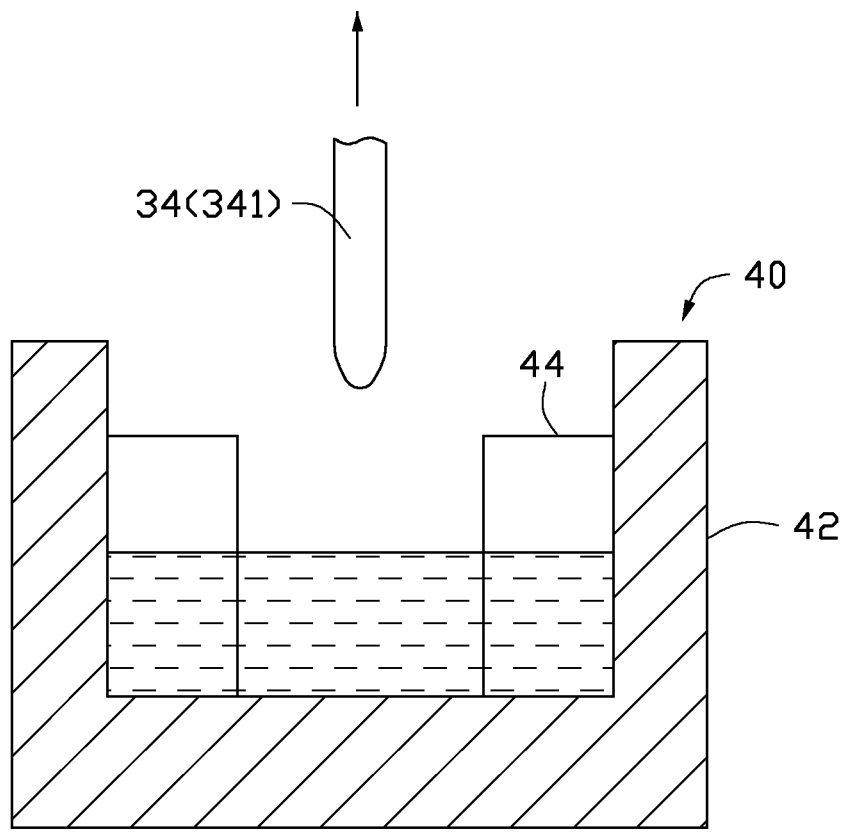

When the dispensing system 100 is in use, the driving device 20 manipulates the dispensing device 30 to move in three-dimensional space to dispense glue into the lens modules 120 received in each lens tray 12. After the dispensing device 30 has performed a preset number of glue dispensations, the driving device 20 moves the dispensing device 30 into the cleaning device 40 to clean off any residual glue. A cleaning frequency of the needle 34 is controlled by the control unit 21. Thus, for example, when glue is dispensed to the lens modules 120 in one row of one lens tray 12, the needle 34 is cleaned once. Specifically, referring to FIGS. 4-6, in this embodiment, when glue has been applied to one row of the lens modules 120, the moving unit 22 drives the dispensing device 30 to move into the cleaning device 40 to immerse the glue output end 344 of the needle 34 in the cleaning liquid 46, and the rotate unit 23 then drives the dispensing device 10 towards the sponge 44 and causes rotation of the glue output end 344 against the sponge 44. Residual glue adhering at a circumference of the glue output end 344 is removed and dissolved in the cleaning liquid 46. After cleaning the needle 34, the moving unit 22 lifts the dispensing device 30 away from the cleaning device 40.

Figure 7:
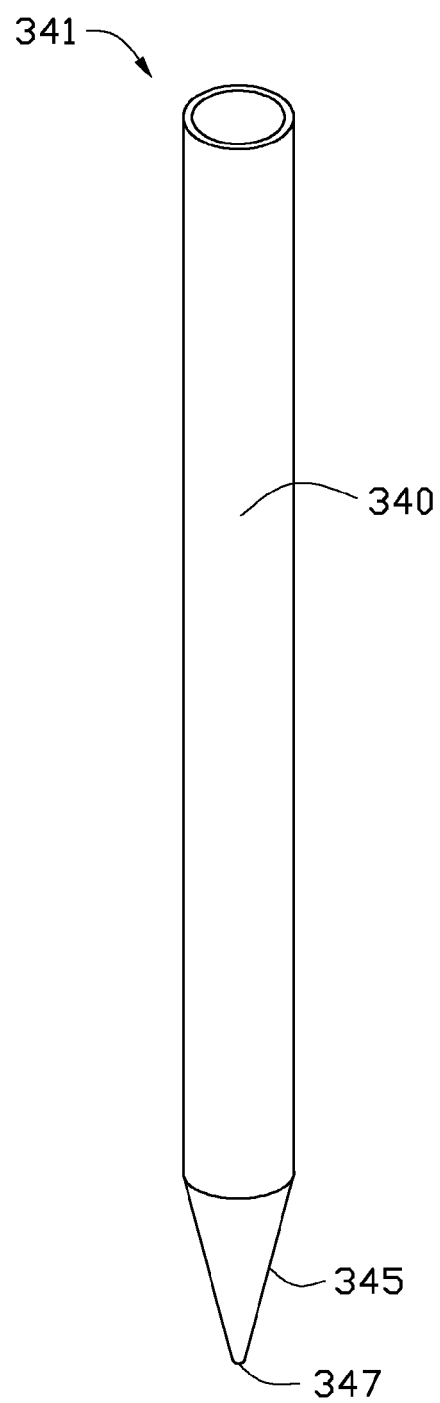
FIG. 7 is a schematic, isometric view of a dispensing needle of a self-cleaning glue dispensing system according to a second embodiment.

Referring to FIG. 7, this shows a needle 341 of a self-cleaning glue dispensing system according to a second embodiment. The dispensing system of the second embodiment is similar to the above-described dispensing system 100. The needle 341 is very fine and includes a tapered glue output end 345. The glue output end 345 defines an opening 347. The diameter of the opening 347 is small enough to prevent glue, under gravity alone, flowing freely out from the needle 341. The dispensing system further includes an air pressure member (not shown) connecting with the container 30, to apply a pressure on glue contained in the container 30 and force the glue out from the needle 341. Other configurations of the dispensing system of the second embodiment are substantially the same as those of the above-described dispensing system 100.

In summary, in both the above-described embodiments, the residual glue on the circumference of the glue output end 344, 345 can be removed from the needle 34, 341 in time during the dispensing process. In this way, the effectiveness of the dispensing system is improved.

It is to be understood, however, that even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A self-cleaning glue dispensing system comprising:
   a support configured for receiving lens modules;
   a dispensing device comprising a container for holding glue, and a dispensing needle for outputting the glue;
   a driving device, the dispensing device fixed to the driving device; and
   a plurality of cleaning devices, the cleaning devices located on the support, the driving device configured to drive the dispensing device to dispense glue onto the lens modules, and drive the dispensing device to move into any given one of the cleaning devices to clean the dispensing needle, wherein the dispensing needle comprises:
      a glue tube comprising a taped glue output end, the glue output end defining a round opening; and
      a ball movably received in the glue tube, a diameter of the ball being greater than a diameter of the round opening; and wherein
      the ball closes the round opening when not being pressed, and opens the round opening when being pressed.

2. The self-cleaning glue dispensing system of claim 1, wherein the support comprises a plurality of lens trays arranged in a regular m×n type array, and each lens trays are configured to receive a number of the lens modules.

3. The self-cleaning glue dispensing system of claim 2, wherein the quantity of the lens trays is equal to the quantity of the cleaning devices, and each of the cleaning devices is arranged beside each of the lens trays.

4. The self-cleaning glue dispensing system of claim 1, wherein each of the cleaning devices comprises a tank, a sponge and cleaning liquid, the sponge is annular and is fixed on the inner wall of the tank, the cleaning liquid is absorbed by the sponge.

5. The self-cleaning glue dispensing system of claim 4, wherein the cleaning liquid is ethanol.

6. The self-cleaning glue dispensing system of claim 4, wherein the cleaning liquid is acetone.

7. The self-cleaning glue dispensing system of claim 1, wherein the driving device comprising a control unit, a moving unit and a rotate unit, the moving unit and the rotate unit are electrically connected with the control unit, the control unit is configured to control the moving unit to move in three-dimensional space and to control the rotate unit to rotate.

8. The self-cleaning glue dispensing system of claim 1, wherein the ball is made of metal.

9. A self-cleaning glue dispensing system comprising:
   a support configured for holding workpieces;
   a dispensing device comprising:
      a container configured for holding glue; and
      a dispensing needle fluidically connected with the container and configured to dispense the glue;
   a driving device, the dispensing device fixed to the driving device; and
   a plurality of cleaning devices located on the support, the driving device configured to drive the dispensing device to dispense glue onto the workpieces, and drive the dispensing device to move into one of the cleaning devices to clean the dispensing needle, wherein the dispensing needle comprises:
      a glue tube comprising a taped glue output end, the glue output end defining a round opening; and
      a ball movably received in the glue tube, a diameter of the ball being greater than a diameter of the round opening; and wherein
      the ball closes the round opening when not being pressed, and opens the round opening when being pressed.

10. The self-cleaning glue dispensing system of claim 9, wherein the support comprises a plurality of lens trays arranged in a regular m×n type array, and each lens trays are configured to receive a number of workpieces.

11. The self-cleaning glue dispensing system of claim 10, wherein the quantity of the lens trays is equal to the quantity of the cleaning devices, and each of the cleaning devices is arranged beside each of the lens trays.

12. The self-cleaning glue dispensing system of claim 9, wherein each of the cleaning devices comprises a tank, a sponge and cleaning liquid, the sponge is annular and is fixed on the inner wall of the tank, the cleaning liquid is absorbed by the sponge.

13. The self-cleaning glue dispensing system of claim 12, wherein the cleaning liquid is ethanol.

14. The self-cleaning glue dispensing system of claim 12, wherein the cleaning liquid is acetone.

15. The self-cleaning glue dispensing system of claim 9, wherein the driving device comprising a control unit, a moving unit and a rotate unit, the moving unit and the rotate unit are electrically connected with the control unit, the control unit is configured to control the moving unit to move in three-dimensional space and to control the rotate unit to rotate.

16. The self-cleaning glue dispensing system of claim 9, wherein the ball is made of metal.

* * * * *